United States Patent [19]
Jensen et al.

[11] Patent Number: 5,647,461
[45] Date of Patent: Jul. 15, 1997

[54] ADJUSTABLE PISTON VALVE DAMPER

[75] Inventors: Eric Lee Jensen, Dayton; William Charles Kruckemeyer, Beaver Creek, both of Ohio

[73] Assignee: General Motors Corporation, Detroit, Mich.

[21] Appl. No.: 554,007

[22] Filed: Nov. 6, 1995

[51] Int. Cl.$^6$ ............................................. F16F 9/34
[52] U.S. Cl. ............................ 188/322.15; 188/317
[58] Field of Search ................................ 188/299, 311, 188/312, 316, 317, 319, 320, 322.15, 315; 267/140.14; 303/117.1

[56] References Cited

U.S. PATENT DOCUMENTS 4,950,029  8/1990  Albertsson et al. .................. 303/117.1
4,974,707  12/1990  Neumann et al. ............. 188/322.15 X
5,042,624  8/1991  Furuya et al. ................. 188/322.15 X

FOREIGN PATENT DOCUMENTS 3830828       3/1990   Germany ............................. 188/319
40-4270377   10/1993   Japan .................................. 303/117.1

Primary Examiner—Peter M. Poon
Attorney, Agent, or Firm—Jeffrey A. Sedlar

[57] ABSTRACT

An adjustable damper is provided with a variable electrically controlled damping rate being effected through the use of a sliding spool control valve carried on the piston in cooperation with a passive damping valve also carried on the piston to provide a compact and unitized assembly. Damping fluid flow through the piston passes through both the control valve and the passive damping valve.

2 Claims, 1 Drawing Sheet

ADJUSTABLE PISTON VALVE DAMPER

BACKGROUND OF THE INVENTION

The present invention relates to adjustable dampers and more particularly, to an electrically adjustable damper with a piston and control valve assembly which provides controlled damping rates for a vehicle suspension.

Conventional vehicle suspension dampers typically consist of direct double-acting telescopic hydraulic passive dampers. They are generally described as either shock absorbers or struts. A primary purpose of shock absorbers is to dampen oscillations of the vehicle suspension spring. This is accomplished by converting kinetic energy in the form of motion between sprung and unsprung masses of a vehicle into heat and then dissipating the heat. Struts also serve this capacity and in addition, support reaction and side-load forces on the suspension.

Typical dampers are hydraulic devices using oil as the medium for converting motion into heat. As the damper is cycled a piston is forced to move in extension and compression directions through the oil that is contained within a cylinder tube. This creates pressure within a portion of the cylinder tube and a consequent pressure drop across the piston. During an extension stroke, high pressure is created in the extension chamber of the cylinder tube above the piston, forcing oil to flow through the valving of the piston. During a compression stroke, high pressure is created in the compression chamber of the cylinder tube below the piston, forcing oil to flow back through the piston's valving. As the piston moves an additional amount of oil substantially equal to the volume of the piston rod entering or exiting the cylinder tube is forced through the piston valving or through a compression valve on the base of the cylinder tube in combination with the piston valving.

As oil is forced to flow through the orifices in the piston valve and/or the compression valve it is heated. Through this mechanism, dampers dissipate energy stored by the vehicle's suspension spring. The extent to which the oil is heated and consequently, the amount of energy dissipated is controlled by the size of the orifices in the valving and the amount of flow forced through the valving.

Damping force is a common measurement of the performance of a damper. It is used to quantify the amount of spring control provided by a damper. Passive dampers are tuned to provide selected vehicle performance characteristics. Because passive dampers provide a set damping force they are generally somewhat of a compromise in providing optimum damping performance over a wide range of operating conditions.

The concept of dampers with an electrically controlled damping rate has been developed in the art wherein an algorithm is used to provide a control mechanism as a means of varying the damping force provided by a damper. This is typically achieved by varying the valving orifices in response to various sensors which are used to detect current real world operating conditions. Such dampers adjust the damping force in response to the control mechanism so that various performance characteristics can be provided by an individual damper.

Electrically controlled hydraulic dampers for vehicle suspensions have, in principle, been known in the art for some time. However, their actual application and use have been somewhat of a recent phenomenon. A known type of adjustable damper which includes a control valve positioned near the piston carries the control valve within the piston rod. This necessitates a piston rod of a relatively large diameter. Additional volume required to accommodate the displacement resulting from a large diameter rod increase the overall size of the damper. Another type of known adjustable damper carries the control valve outside the cylinder tube. This type of design necessitates consideration of the externally carried valve when packaging the damper within the suspension system.

SUMMARY OF THE INVENTION

It is an aspect of the present invention to provide a relatively compact damper with variable damping fluid flow control. An adjustable damper in accordance therewith includes a tube slidably carrying a piston which separates the tube into extension and compression chambers. The piston carries a relatively compact control valve for controlling fluid flow through the piston. The control valve provides a variable amount of damping by regulating damper fluid flow between the extension chamber and the compression chamber of the damper during extension and compression strokes. A bi-directional passive damping valve mechanism is additionally positioned on the piston between the extension and compression chambers. The passive damping valve provides damping during both extension and compression strokes of the damper. Optionally, the single two-way passive damping valve is replaced by two one-way passive damping valves.

The control valve includes a single movable element in the form of a spool. The flow passages through the piston communicate with ports in the control valve, and flow therethrough is alternately interrupted or permitted as determined by the electrical control system. At least one electrical coil is positioned adjacent the spool bore to provide a motive force to reposition the moving valve element. The control valve is selectively tuned by adjusting the amount of clearance between the moving valve element and its bore wherein a designed-in clearance is utilized to provide a continuous amount of limited flow through the control valve.

Advantages of the present invention include internal packaging of the control valve which utilizes less space than externally packaged designs which carry the control valve outside the cylinder tube or designs that carry the control valve within the piston rod. Additionally, the invention is readily applicable to monotube or twin-tube damper designs.

DETAILED DESCRIPTION OF THE PRESENTLY PREFERRED EMBODIMENT

Figure 1:
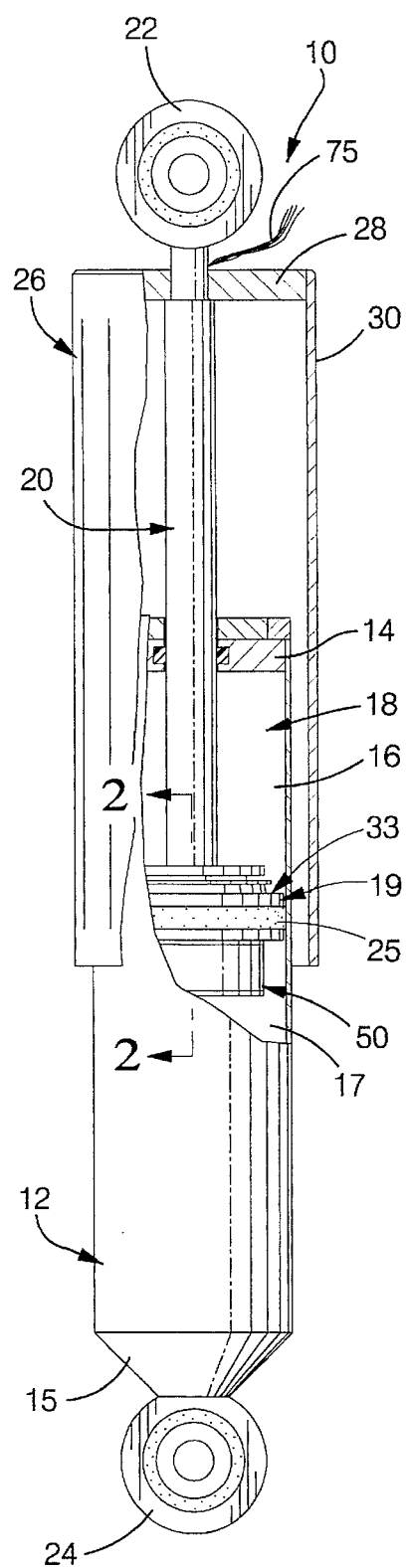
FIG. 1 is a fragmentary cross sectional view of an adjustable damper.

Referring to the drawings, illustrated in FIG. 1 is an adjustable damper embodied as shock absorber 10. Shock absorber 10 includes a cylinder tube 12 having a closed lower end 15 and carrying an upper rod guide 14 to define a cylindrical cavity 18. Cylindrical cavity 18 is divided into extension chamber 16 and compression chamber 17 by a piston assembly 19. Piston assembly 19 is sealingly disposed in cylinder tube 12 for axial movement therein.

Securely connected to piston assembly 19 by a conventional means is piston rod 20 which extends through extension chamber 16 of cylinder tube 12. Piston rod 20 exits cylinder tube 12 through rod guide 14 and is sealingly engaged therewith. The upper end of the piston rod 20 includes an attachment fitting 22 for connection to the sprung mass (body), of the motor vehicle in a conventional manner. A similar attachment fitting 24 is provided at the lower end 15 of cylinder tube 12 for connection to the unsprung mass (wheel assembly), of the vehicle in a conventional manner.

A dust tube 26 comprises a radial disc portion 28 attached to piston rod 20 adjacent attachment fitting 22 and a cylindrical portion 30 projecting downward from disc portion 28 around a substantial length of cylinder tube 12. Relative movement between the sprung and unsprung masses of the vehicle, to which shock absorber 10 is connectable, produces relative axial movement of the piston assembly 19 within the cylinder tube 12.

Figure 2:
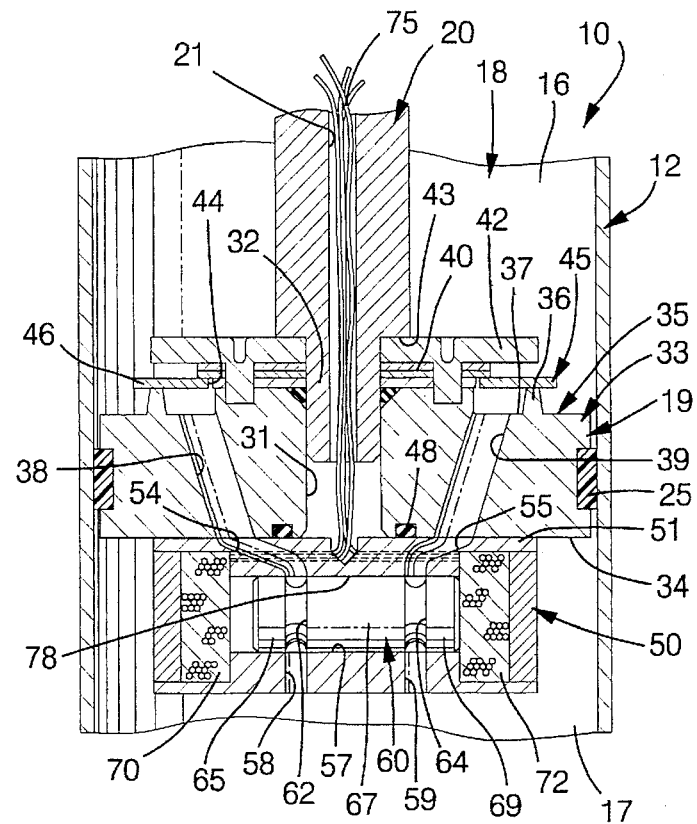
FIG. 2 is a detailed cross sectional view of the piston area of the adjustable damper of FIG. 1.

Referring to FIG. 2, the piston area of the shock absorber 10 is shown in greater detail. The piston rod 20 includes axial opening 21 which extends along the length of the piston rod 20. Piston rod 20 also includes a reduced diameter portion 32 that extends into opening 31 of piston body 33 and is securely connected therein.

The piston body 33 generally comprises a cylindrical disc with an integral annular rib 36 formed on the top surface 35 thereof. An annular trough 37 is formed on the top surface 35 radially inside the annular rib 36. A series of flow passages represented by flow passages 38 and 39 extend through the piston body 33 from annular trough 37 to the bottom surface 34.

A series of annular plates 40 and a compression disc stop 42 are pressed against the piston body 33 by an annular shoulder 43 of piston rod 20. An annular valve disc 45 is carried between the annular plates 40 and annular rib 36 substantially closing off the trough 37 and therefore, closing off the flow passages 38 and 39 from the extension chamber 16.

During a compression stroke of the piston assembly 19, the outer perimeter 46 of the annular valve disc 45 deflects upward off the annular rib 36 permitting flow from the flow passages 38 and 39 into the extension chamber 16 from the compression chamber 17. A pressure drop is generated across the annular valve disc 45 and therefore, damping force is provided as the piston 19 moves within the cylinder tube 12.

When the piston 19 moves in an extension stroke in the cylinder tube 12, the outer perimeter 46 of the annular valve disc 45 remains seated upon the annular rib 36 while the inner perimeter 44 of the annular valve disc 4S deflects downward off the annular plates 40 opening a flow path through the flow passages 38 and 39 from the extension chamber 16 into the compression chamber 17. A pressure drop across the annular valve disc 4S is effected which results in damping force as the piston 19 slides within the cylinder tube 12.

A control valve 50 is carried on the bottom surface 34 of the piston 19 providing a compact assembly therewith. A resilient seal 48 is carried between the piston body 33 and the control valve body 51 providing a fluid-tight seal between the flow passages 38, 39 and the axial opening 21 in piston rod 20.

The body 51 includes a series of upper flow openings, representative of which are upper flow openings 54 and 55, that communicate with flow passages 38 and 39 respectively, of piston body 33. The upper flow openings 54 and 55 also communicate with bore 57 of body 51. A series of lower flow openings, representative of which are lower flow openings 58 and 59 extend through the body 51 between the bore 57 and compression chamber 17.

A generally cylindrical moving valve element designated as spool 60 is slidably carried in bore 57. Spool 60 includes undercuts 62 and 64 which are formed between lands 65 and 67 and lands 67 and 69, respectively. In the open position of the control valve 50 as shown in FIG. 2, the undercuts 62 and 64 register with the flow openings 54 and 58 and the flow openings 55 and 59 respectively. In this open position, fluid flow through the piston assembly 19 between the extension chamber 16 and the compression chamber 17 freely flows through the open control valve 50.

The control valve assembly 50 also includes a pair of electromagnetic coil assemblies 70 and 72 which are located on opposite ends of the bore 57. The coils 70 and 72 comprise a plurality of turns of wire wound on a bobbin and communicate with control electronics through lead bundle 75 which extends from the coils 70 and 72 through the control valve body 51, the opening 31 in piston body 33 and the axial opening 21 of piston rod 20. The lead bundle 75 extends from the shock absorber 10 at a position adjacent the attachment fitting 22 which is held in a relatively fixed position on the vehicle body (not illustrated).

Figure 3:
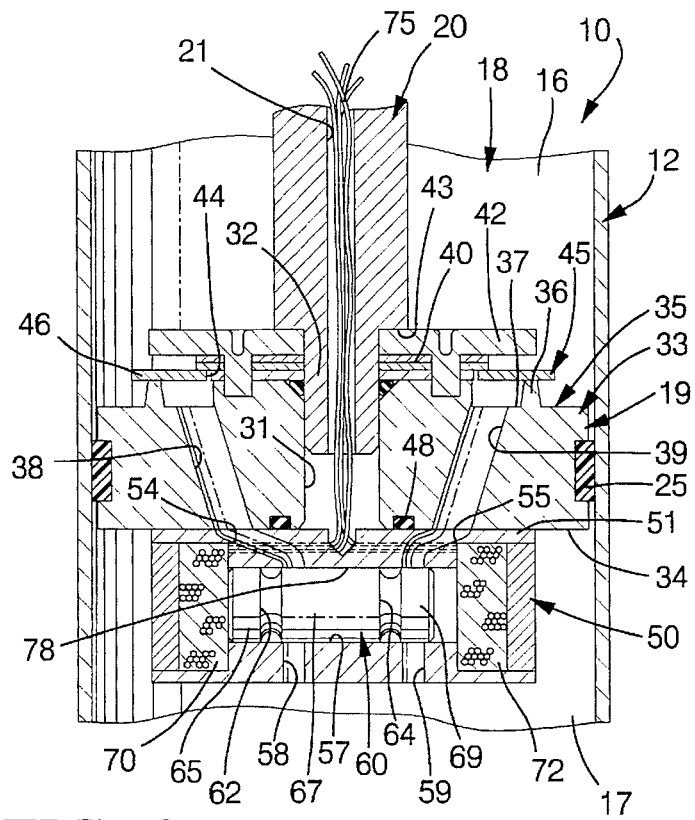
FIG. 3 is a detailed cross sectional view of the piston area of the adjustable damper of FIG. 1.

Two coils 70 and 72 are provided to minimize the overall size of the control valve assembly 50 while providing sufficient force to ensure movement of the spool 60 during operation of the shock absorber 10. The coils 70 and 72 are selectively energizable to move the spool 60 between the open position as shown in FIG. 2 and a closed position as illustrated in FIG. 3. When the spool 60 is in the closed position of FIG. 3, fluid communication is substantially interrupted between the extension chamber 16 and the compression chamber 17 through the piston assembly 19. The land 67 of spool 60 substantially blocks fluid flow between the upper flow opening 54 and the lower flow opening 58. The land 69 also substantially interrupts flow between the upper flow opening 55 and the lower flow opening 59.

However, in the closed position, a selected amount of flow is permitted through the control valve 50 due to a specifically designed-in clearance between the spool 60 and the bore 57. This small clearance designated as 78 permits a selected small amount of fluid flow through the control valve assembly 50 even under a closed condition as shown in FIG. 3.

When preferable, the clearance 78 is minimized to the point that the amount of flow is negligible when the control valve 50 is in the closed position. In combination with the piston seal 25 this optional construction will substantially prevent the flow of fluid between the extension chamber 16 and the compression chamber 17 of the shock absorber 10.

Through means of the foregoing structure a compact way of controlling the pressure drop as fluid flows from one side of the piston assembly 19 to the other is provided. The pressure drop is modified by an electrical signal communicated to the control valve assembly 50 wherein the spool 60 is moved between opened and closed positions preferably in rapid succession to change the relative damping force between the body and wheel of a vehicle. Since the control valve 50 is carried under the piston 19 instead of within the rod 20 the rod diameter can remain quite small for a damper with an internal electrically adjustable valve. The relatively small rod size reduces the amount of volumetric compensation required for fluid displacement and reduces the overall size requirements of the shock absorber 10. The flow path to the deflectable valve disc 45 of the piston 19 remains relatively direct minimizing compliance effects that tend to result from conventional designs.

What is claimed is:

1. An adjustable damper comprising:

a tube;

a piston slidably carried within the tube;

a damping valve carried on the piston;

a control valve carried on the piston including a slidable valve spool carried in a bore wherein a damping level provided by the piston is adjustable in response to selective sliding of the spool wherein the spool includes a first end and a second end and further comprising a first coil positioned at the bore near the first end and a second coil positioned at the bore near the second end wherein the piston includes a body with a top surface and a bottom surface and wherein the damping valve is a single annular bi-directional valve disc and is carried adjacent the top surface of the piston body and wherein the control valve is carried adjacent the bottom surface of the piston body.

2. An adjustable damper operable in extension and compression strokes comprising:

a tube;

a piston slidably carried within the tube and separating the tube into an extension chamber and a compression chamber with flow passages extending through the piston between the extension and compression chambers;

a single bi-directional passive damping valve positioned on the piston between the extension and compression chambers, the passive damping valve normally substantially closing the flow passages and providing damping during both extension and compression strokes of the damper;

a control valve carried on the piston controlling fluid flow through the piston flow passages and providing a variable amount of damping by regulating damper fluid flow between the extension chamber and the compression chamber of the damper during extension and compression strokes, the control valve including a single movable element in the form of a spool carried in a spool bore with the flow passages through the piston communicating with ports in the control valve wherein flow through the control valve is alternately interrupted and permitted; and a first electrical coil and a second electrical coil positioned adjacent the spool bore and working in concert providing a selective motive force to selectively position the spool wherein the piston includes a top surface with an annular trough and a bottom surface wherein the flow passages intersect the annular trough and open through the bottom surface and wherein the control valve is positioned against the bottom surface and further comprising a seal positioned radially inside the flow passages at the bottom surface and between the piston and the control valve and wherein damping is controlled solely by the single bi-directional passive damping valve and the spool.

* * * * *